Patented Feb. 8, 1949

2,461,503

UNITED STATES PATENT OFFICE 2,461,503

PROCESS FOR THE MANUFACTURE OF 2-AMINO-6-HYDROXY-8-(HYDROXY-METHYL) PTERIDINE

Hans Spiegelberg and Gérald Rey-Bellet, Basel, Switzerland, assignors to Hoffmann-La Roche Inc., Nutley, N. J., a corporation of New Jersey No Drawing. Application January 24, 1948, Serial No. 4,219. In Switzerland February 3, 1947

1 Claim. (Cl. 260—251)

Pteridines are prepared by reacting 4,5-diamino-pyrimidine with a 1,2-di-oxo-compound or a 2-oxo-carboxylic acid.

It has now been found, according to the present invention, that the hitherto unknown 2-amino-6-hydroxy-8-(hydroxymethyl)-pteridine may easily be obtained by heating dihydroxyacetone with 2,4-diamino-5-nitroso-6-hydroxy-pyrimidine in alkaline solution.

In analogy to the usual methods for preparing pteridines, 2-amino-6-hydroxy-8-(hydroxymethyl)-pteridine would be obtained by condensing 2,4,5-triamino-6-hydroxy-pyrimidine with hydroxymethyl-glyoxal (reductone). The process of the present invention entails the double advantage of making unnecessary the preparation of the said triamino-pyrimidine, on the one hand, and of allowing the easily obtainable dihydroxyacetone to be used in place of hydroxymethyl-glyoxal, obtainable only with difficulty, on the other hand.

The 2-amino-6-hydroxy-8-(hydroxymethyl)-pteridine is a micro-crystalline light yellow powder which decomposes at a temperature above 300° C. and which is hardly soluble in water and organic solvents. It is useful as intermediate for the preparation of compounds valuable in therapy.

The 2-amino-6-hydroxy-8-(hydroxy-methyl) pteridine is specifically claimed as a new compound in the co-pending application Serial No. 746,866, filed by one of us on May 8, 1947. This new compound has the formula

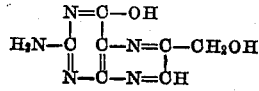

Example 7.75 parts by weight of 2,4-diamino-5-nitroso-6-hydroxy-pyrimidine, 175 parts of water, and 100 parts by weight of normal sodium hydroxide are heated to boiling and filtered, whereupon 30 parts by weight of dihydroxy-acetone are added in one lot. After boiling for 2 minutes, the color has changed from red to brown, and the reaction is terminated. A small precipitate is filtered off, and the filtrate is acidified with acetic acid, whereby 3.75 parts by weight of almost pure 2-amino-6-hydroxy-8-(hydroxy-methyl)-pteridine are obtained. For complete purification, the product is recrystallized from 3000 parts of water.

We claim:

Process for the manufacture of 2-amino-6-hydroxy-8-(hydroxymethyl)-pteridine, comprising heating dihydroxy-acetone with di-amino-5-nitroso-6-hydroxy-pyrimidine in alkaline solution to produce a compound of the formula

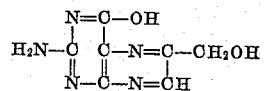

HANS SPIEGELBERG.
GÉRALD REY-BELLET.

No references cited.